(12) United States Patent
Okubo

(10) Patent No.: US 10,516,329 B2
(45) Date of Patent: Dec. 24, 2019

(54) POWER CONVERTER SYSTEM

(71) Applicant: DENSO CORPORATION, Kariya, Aichi-pref. (JP)

(72) Inventor: Takuya Okubo, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 16/412,682

(22) Filed: May 15, 2019

(65) Prior Publication Data

US 2019/0356214 A1    Nov. 21, 2019

(30) Foreign Application Priority Data

May 18, 2018   (JP) .................................. 2018-096553

(51) Int. Cl.
*H02M 1/12*     (2006.01)
*H02M 7/537*    (2006.01)

(52) U.S. Cl.
CPC ............. *H02M 1/12* (2013.01); *H02M 7/537* (2013.01)

(58) Field of Classification Search
CPC .. H02M 1/12; H02M 2001/0006; H02M 7/42; H02M 7/44; H02M 7/53; H02M 7/537; H02M 7/53871
See application file for complete search history.

(56) References Cited

U.S. PATENT DOCUMENTS

| 2004/0100328 A1* | 5/2004 | Melanson | H03F 1/26 330/297 |
| 2006/0280314 A1* | 12/2006 | Okada | H03F 3/217 381/71.1 |
| 2007/0279948 A1* | 12/2007 | Shin | H02M 7/53875 363/41 |
| 2011/0094075 A1* | 4/2011 | Lee | H02M 1/44 29/25.41 |
| 2013/0265808 A1* | 10/2013 | Ishii | H02M 1/12 363/97 |

FOREIGN PATENT DOCUMENTS

JP          2016-152716 A        8/2016

* cited by examiner

*Primary Examiner* — Gary L Laxton
(74) *Attorney, Agent, or Firm* — Oliff PLC

(57) ABSTRACT

In a power converter system, a control unit includes a drive circuit controlling on-off switching operations of a converter switch, and a power supply circuit that includes a power supply switch and a transformer connected to the power supply switch. The control unit includes a frequency changing unit that receives a reception frequency of a radio receiver, and calculates harmonic frequencies of a driving frequency of the power supply switch. The control unit determines whether an absolute value of each of frequency differences between any of the harmonic frequencies and the reception frequency is equal to or smaller than a predetermined threshold. The control unit changes the driving frequency such that the absolute value of at least one of the frequency differences becomes greater than the predetermined threshold when determining that the absolute value is equal to or smaller than the predetermined threshold.

9 Claims, 12 Drawing Sheets

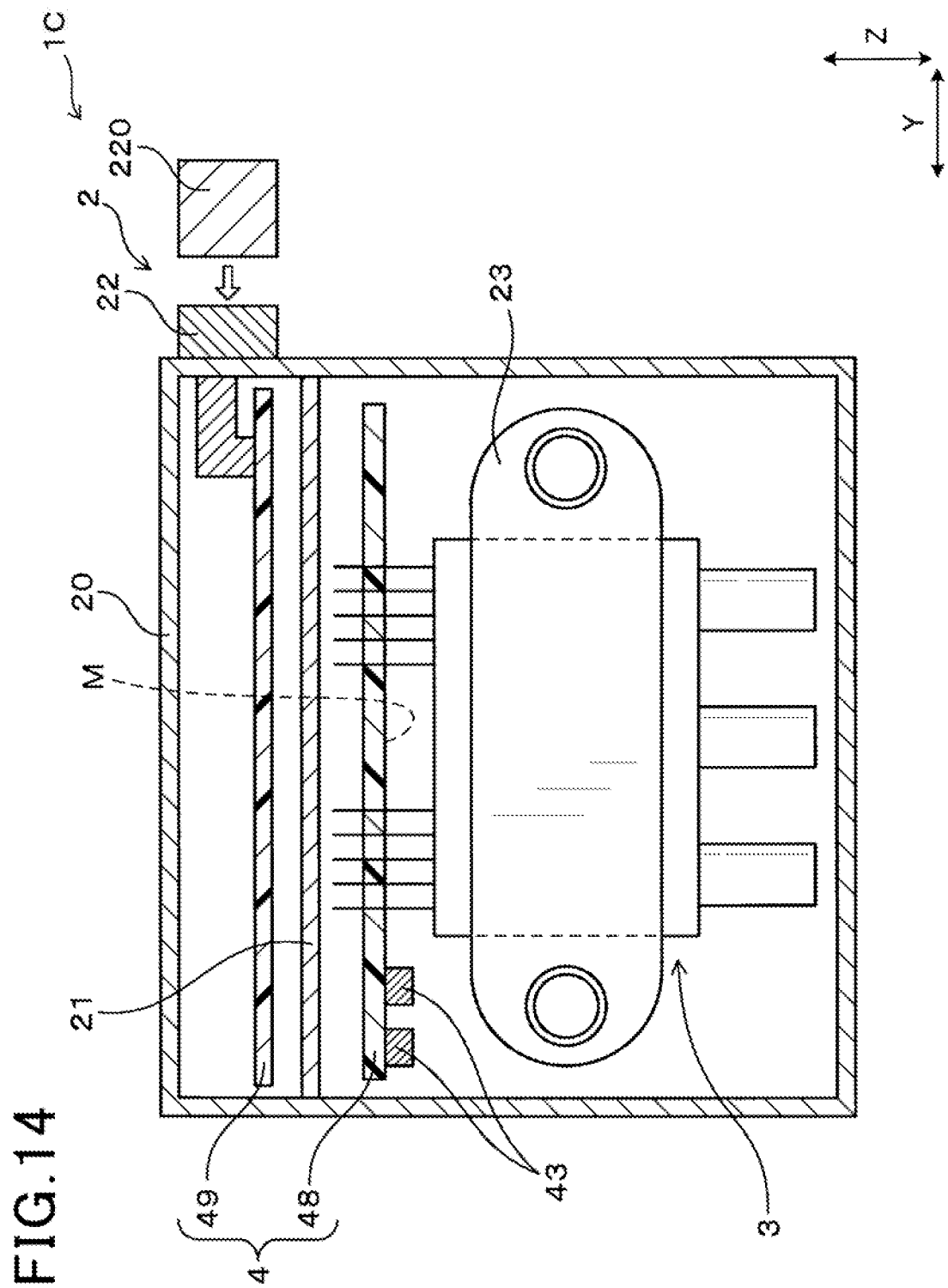

POWER CONVERTER SYSTEM

CROSS REFERENCE TO RELATED APPLICATION

This application is based on and claims the benefit of priority from Japanese Patent Application No. 2018-096553 filed on May 18, 2018, the disclosure of which is incorporated in its entirety herein by reference.

TECHNICAL FIELD

The present disclosure relates to power converter systems each including a power converter, such as an inverter, and a radio receiver. The power converter includes a power supply circuit, and the radio receiver is arranged to be close to the power converter.

BACKGROUND

Known control systems control a power supply circuit that includes switches. Such a control system is configured to control on-off switching operations of the switches to accordingly increase or decrease a direct-current (DC) voltage to be supplied to a load.

SUMMARY

A power converter system according to an exemplary aspect of the present disclosure includes a power converter including a semiconductor module, the semiconductor module including a converter switch, and a control unit for controlling operation of the converter switch to thereby cause the power converter to convert input power to output power.

The power converter includes a radio receiver arranged to be close to the power converter. The control unit includes a frequency changing unit configured to obtain a reception frequency of the radio receiver, and calculate harmonic frequencies of the driving frequency of the power supply switch.

The frequency changing unit is configured to determine whether an absolute value of each of frequency differences between any of the harmonic frequencies and the reception frequency is equal to or smaller than a predetermined threshold. The frequency changing unit is configured to change the driving frequency such that the absolute value of at least one of the frequency differences becomes greater than the predetermined threshold when determining that the absolute value of the at least one of the frequency differences is equal to or smaller than the predetermined threshold.

BRIEF DESCRIPTION OF THE DRAWINGS

Other aspects of the present disclosure will become apparent from the following description of embodiments with reference to the accompanying drawings in which:

FIG. 14 is a cross-sectional view of the inverter according to a fourth embodiment of the present disclosure.

DESCRIPTION OF EMBODIMENT

Inventor's View Point

Figure 1:
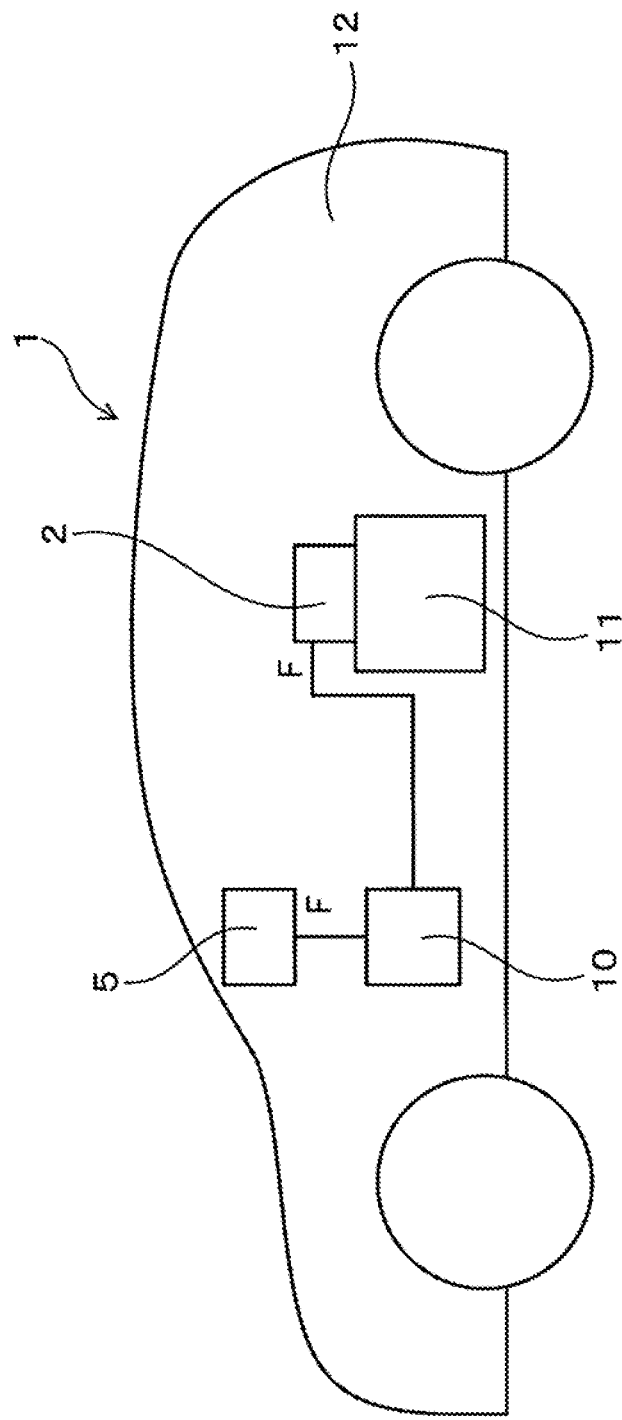
FIG. 1 is a block diagram schematically illustrating an example of the structure of a power converter system according to the first embodiment of the present disclosure.

Known control systems, an example of which is disclosed in Japanese Patent Application Publication No. 2016-152716, control a power supply circuit that includes switches. Such a control system is configured to control on-off switching operations of the switches to accordingly increase or decrease a direct-current (DC) voltage to be supplied to a load.

On-off switching operations of the switches at a predetermined driving frequency may cause harmonics of the driving frequency to be radiated as electromagnetic noise around the power supply circuit. The radiated harmonics cause noise to be generated in a radio receiver arranged to be close to the power supply circuit when one of the frequencies of the harmonics substantially matches with a selected radio frequency of the radio receiver.

For solving such an issue, the control system disclosed in the above published patent document increases or decreases power consumed by the load to indirectly change the driving frequency of the switches, thus deviating the frequencies of the harmonics from the selected radio frequency of the radio receiver. This aims to reduce noise radiated from the radio receiver.

The method of increasing or decreasing power consumed by the load to indirectly change the driving frequency of the switches may unfortunately result in difficulty in accurate control of the driving frequency. This may make it difficult to sufficiently separate the frequencies of the harmonics from the selected radio frequency of the radio receiver. This may cause the frequencies of the harmonics to approach the selected radio frequency, resulting in noise being generated in the radio receiver.

In particular, a power supply circuit, which is designed to include a transformer, may likely generate a large amount of electromagnetic noise from coils of the transformer, and the large amount of electromagnetic noise may cause noise to be generated in the radio receiver.

In addition, when such a power supply circuit is applied as a power source of an inverter, the driving frequency of the switches of the power supply circuit is usually set to several hundreds of kilohertz (kHz). This may cause the frequencies of second or third harmonics radiated from the power supply circuit to be included in an amplitude-modulation (AM) radio frequency band, resulting in noise being generated in the radio receiver due to the second or third harmonics.

It is therefore desired to prevent a large amount of noise from being generated from the radio receiver due to electromagnetic noise radiated from the power supply circuit for an inverter.

From the above viewpoint, the present disclosure seeks to provide power converter systems, each of which is capable of restraining noise from being generated from a radio receiver due to electromagnetic noise radiated from a power supply circuit of a power converter.

A power converter system according to an exemplary aspect of the present disclosure includes a power converter including a semiconductor module, the semiconductor module including a converter switch, and a control unit for controlling operation of the converter switch to thereby cause the power converter to convert input power to output power. The power converter includes a radio receiver arranged to be close to the power converter. The control unit includes a drive circuit configured to control on-off switching operations of the converter switch, and a power supply circuit that includes a power supply switch and a transformer connected to the power supply switch. The power supply circuit is configured to cyclically turn on the power supply switch at a driving frequency to accordingly generate a power supply voltage for the drive circuit. The control unit includes a frequency changing unit configured to obtain a reception frequency of the radio receiver, and calculate harmonic frequencies of the driving frequency of the power supply switch. The frequency changing unit is configured to determine whether an absolute value of each of frequency differences between any of the harmonic frequencies and the reception frequency is equal to or smaller than a predetermined threshold. The frequency changing unit is configured to change the driving frequency such that the absolute value of at least one of the frequency differences becomes greater than the predetermined threshold when determining that the absolute value of the at least one of the frequency differences is equal to or smaller than the predetermined threshold.

The frequency changing unit of the control unit according to an exemplary aspect of the present disclosure calculates the harmonic frequencies of the driving frequency of the power supply switch, and determines whether an absolute value of each of frequency differences between any of the harmonic frequencies and the reception frequency is equal to or smaller than a predetermined threshold.

The frequency changing unit changes the driving frequency such that the absolute value of at least one of the frequency differences becomes greater than the predetermined threshold when determining that the absolute value of the at least one of the frequency differences is equal to or smaller than the predetermined threshold.

This makes it possible to separate the harmonic frequencies that are frequencies of harmonics (i.e., electromagnetic noise) from the reception frequency by at least the threshold, thereby efficiently restraining noise from being generated from the radio receiver.

In addition, a method described in the related art, which increases or decreases power consumption of a load to indirectly change the driving frequency of a power supply switch. This may make it difficult to accurately control the driving frequency. Accordingly, the harmonic frequencies may not be sufficiently separated from the reception frequency, resulting in noise being generated in the radio receiver.

In contrast, the power converter system directly controls the driving frequency of the power supply switch to thereby accurately control the driving frequency of the power supply switch. Accordingly, the power converter system results in the harmonic frequencies being sufficiently separated from the reception frequency, resulting in electromagnetic noise being unlikely to be generated, thereby preventing generation of noise in the radio receiver.

As described above, the power converter system according to the above aspect is capable of restraining a large amount of noise from being generated in the radio receiver from the power converter circuit.

Embodiment

The following describes embodiments of the present disclosure with reference to the accompanying drawings. In the embodiments, like parts between the embodiments, to which like reference characters are assigned, are omitted or simplified to avoid redundant description.

First Embodiment

The following describes a power converter system 1 according to the first embodiment of the present disclosure with reference to FIGS. 1 to 7. As illustrated in FIG. 1, the power converter system 1 according to this embodiment includes an inverter 2, which is an example of a power converter, and a radio receiver 5 arranged to be close to the inverter 2.

Figure 2:
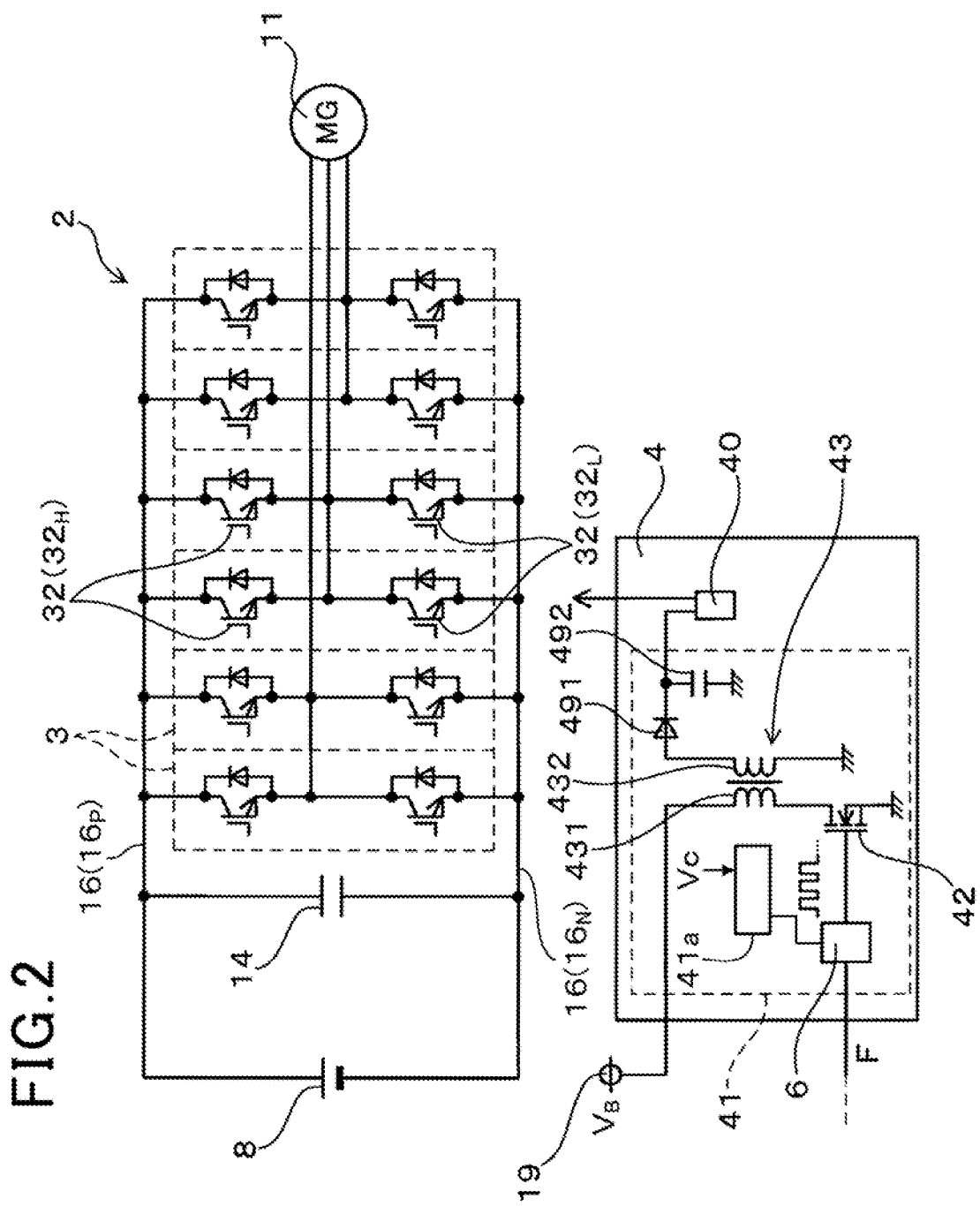
FIG. 2 is a circuit diagram schematically illustrating an example of the structure of each of an inverter and a control unit according to the first embodiment.
Figure 4:
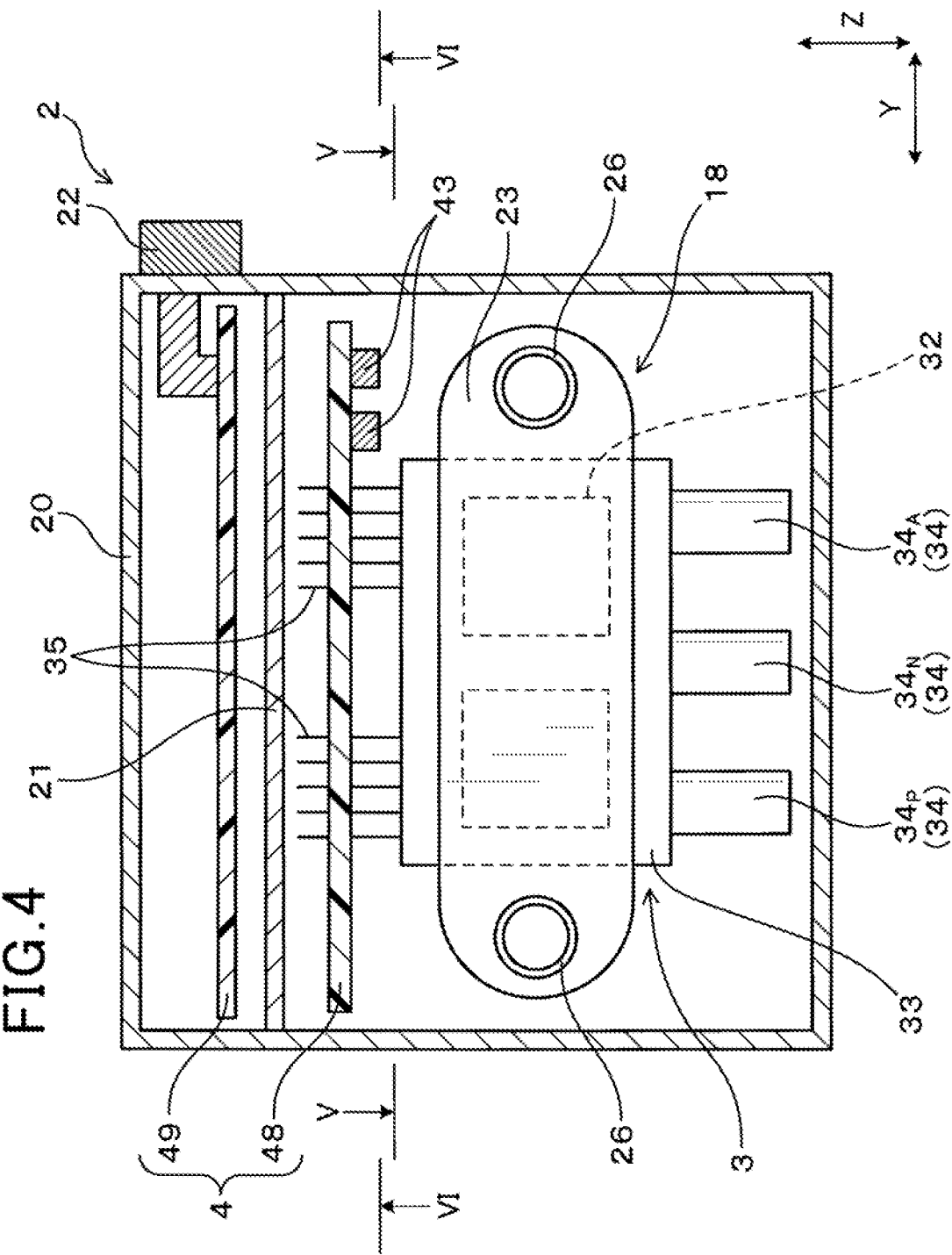
FIG. 4 is a cross-sectional view taken along IV-IV in FIG. 5.

As illustrated in FIGS. 2 and 4, the inverter 2 includes semiconductor modules 3 and a control unit 4. The semiconductor modules 3 include inverter switches 32. The control unit 4 controls operations of the inverter switches 32.

As illustrated in FIG. 2, the control unit 4 includes a drive circuit 40 and a power supply circuit 41. The drive circuit 40 individually supplies a voltage pulse (on pulse) V to each of the inverter switches 32 at a predetermined switching frequency, thus turning on each of the inverter switches 32 at the predetermined switching frequency. In addition, the power supply circuit 41 includes a power supply switch 42 and a transformer 43 that is connected to the power supply switch 42 and to a low-voltage battery 190. The power supply circuit 41 is configured to cyclically turn on the power supply switch 42 at a driving frequency f to accordingly generate a power source voltage for the drive circuit 40 based on a voltage $V_B$ supplied from the low-voltage battery 19.

The control unit 4 includes a frequency changing unit 6 that changes a driving frequency f of a driving signal, i.e. a cyclic pulse signal, for the power supply switch 42. The frequency changing unit 6 receives a reception frequency F tuned, i.e. selected, by the radio receiver 5. In addition, the frequency changing unit 6 calculates harmonic frequencies $f_n$ (see FIG. 3) that are harmonic frequencies of the driving frequency f of the drive signal for the power supply switch 42.

The frequency changing unit 6 determines whether an absolute value of each of frequency differences Δf between any of the harmonic frequencies $f_n$ and the reception frequency F is equal to or smaller than a predetermined threshold $f_{TH}$, and changes the driving frequency f such that the absolute value of at least one of the frequency differences Δf becomes greater than the threshold $f_{TH}$ upon determining that the absolute value of the at least one of the frequency differences Δf between at least one of the harmonic frequencies $f_n$ and the reception frequency F is equal to or smaller than the threshold $f_{TH}$.

As illustrated in FIG. 1, the power converter system 1 according to the first embodiment serves as a vehicular power converter system to be mounted on a vehicle 12, such as an electric vehicle or a hybrid vehicle.

The power converter system 1 includes an electronic control unit (ECU) 10 and a three-phase motor 11 installed in the vehicle 12 in addition to the radio receiver 5, the inverter 2, and other in-vehicle devices.

The radio receiver 5 and the inverter 2 are connected to the ECU 10. Through the ECU 10, the reception frequency F of the radio receiver 5 is transmitted to the frequency changing unit 6 in the inverter 2. The inverter 2 is directly mounted on the three-phase motor 11.

As illustrated in FIG. 2, the inverter 2 according to the first embodiment includes the semiconductor modules 3 set forth above. Each of the semiconductor modules 3 includes a pair of upper- and lower-arm switches $32_H$ and $32_L$ that are connected to each other in series.

Each of the inverter switches $32_H$ and $32_L$ is comprised of, for example, an IGBT and a flyback diode connected in antiparallel to the IGBT. Each of the inverter switches $32_H$ and $32_L$ can be comprised of a MOSFET with an intrinsic diode serving as a flyback diode. Each of the inverter switches $32_H$ and $32_L$ has first and second terminals and a control terminal. The first terminals of the upper-arm inverter switches $32_H$ are connected to a positive electrode of a direct-current (DC) power source 8 via a positive busbar $16_P$, and the second terminals of the upper-arm inverter switches $32_H$ are respectively connected to the first terminals of the corresponding lower-arm inverter switches $32_L$. The second terminals of the lower-arm inverter switches $32_L$ are respectively connected to a negative electrode of the DC power source 8 via a negative busbar $16_N$. The control terminals of the inverter switches $32_H$ and $32_L$ are connected to the drive circuit 40 of the control unit 4.

The drive circuit 40 controls on-off switching operations of each inverter switch 32 of the inverter 2 to thereby enable the inverter 2 to convert direct-current (DC) power supplied from the DC power source 8 into alternating-current (AC) power, and supplies the AC power to the three-phase motor 11 to accordingly drive the three-phase motor 11, thus causing the vehicle 12 to travel.

The control unit 4 also includes the drive circuit 40 and the power supply circuit 41 as described above.

The power supply circuit 41 includes the transformer 43, the power supply switch 42, a rectifier diode 491, and a smoothing capacitor 492. The power supply switch 42 has a first terminal, a second terminal, and a control terminal connected to the frequency changing unit 6. The smoothing capacitor 492 is comprised of first and second electrode plates that face each other.

The transformer 43 includes a primary coil 431 and a secondary coil 432 arranged such that they can be magnetically coupled to each other. The primary coil 431 has opposing first and second ends, the first end of the primary coil 431 is connected to the low-voltage battery 19, and the second end of the primary coil 431 is connected to the first terminal of the power supply switch 42. The second terminal of the power supply switch 42 is connected to a common signal ground.

The secondary coil 432 has opposing first and second ends, the first end of the secondary coil 432 is connected to the anode of the rectifier diode 491, and the second end of the secondary coil 432 is connected to, for example, the common signal ground. The cathode of the rectifier diode 491 is connected to the first electrode plate of the smoothing capacitor 492 and to the drive circuit 40, and the second electrode plate of the smoothing capacitor 492 is connected to the common signal ground.

The number of turns of the secondary coil 432 is set to be larger than that of the primary coil 431.

Controlling on-off switching operations of the power supply switch 42 by the frequency changing unit 6 enables the voltage $V_B$ of the low-voltage battery 19 to be boosted to a voltage $V_C$, and the boosted voltage $V_C$ is supplied to the drive circuit 40.

Figure 3:
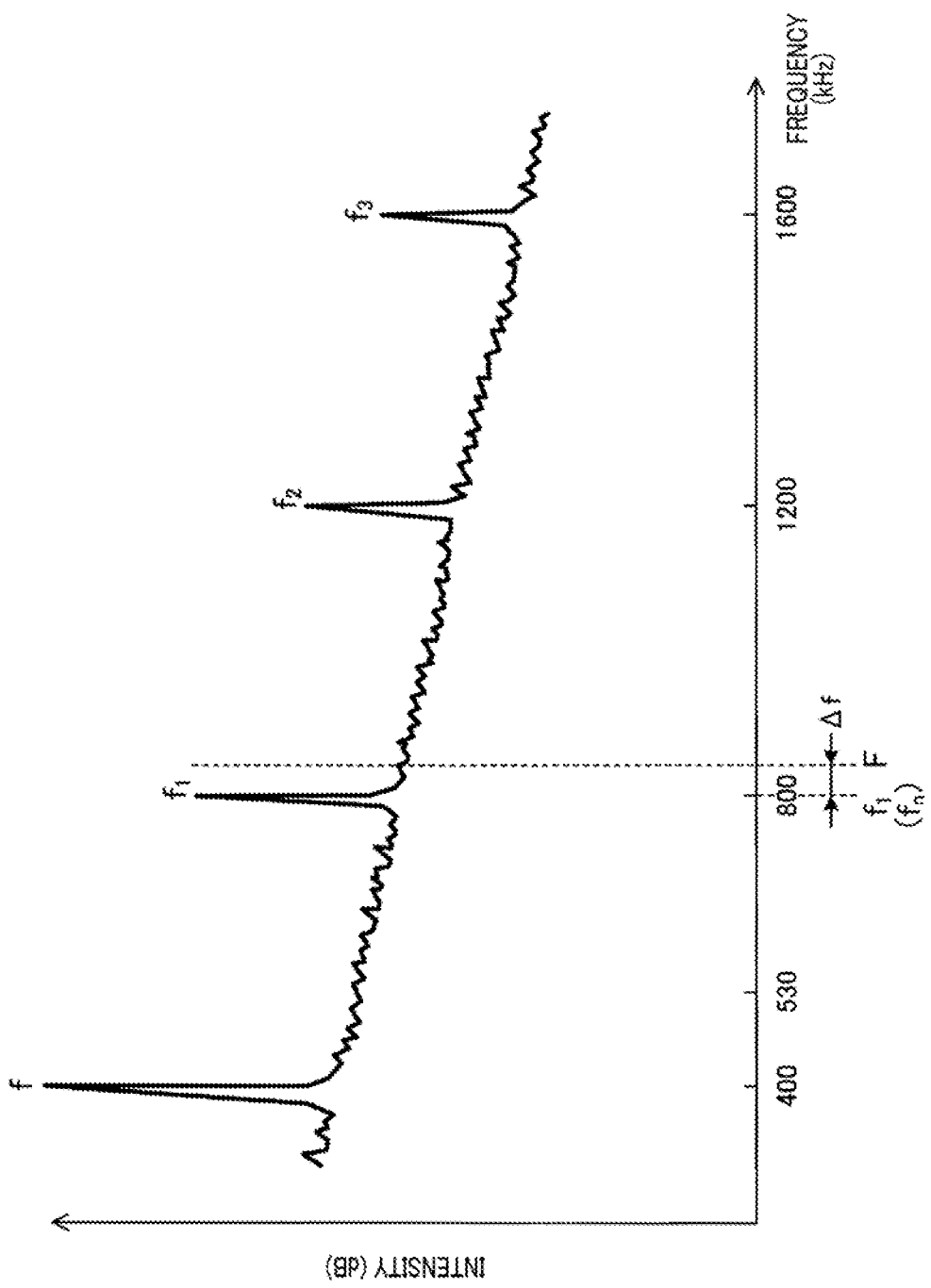
FIG. 3 is a graph schematically illustrating frequency characteristics of electromagnetic noise radiated from the inverter according to the first embodiment.

Performing on-off switching operations of the power supply switch 42 may result in electromagnetic noise being radiated from the primary coil 431 and the secondary coil 432 of the transformer 43. As illustrated in FIG. 3, the electromagnetic noise has peaks at the driving frequency f and its harmonic frequencies $f_1$, $f_2$, and $f_3$.

If the harmonics are within an AM radio broadcasting band (526.5-1606.5 kHz), noise is likely to be generated while the radio receiver 5 receives AM radio. Accordingly, the frequency changing unit 6 is configured to adjust the driving frequency f of the power supply switch 42 such that the absolute value of each of the frequency differences Δf between any of the plurality of harmonic frequencies $f_1$, (i.e., $f_1$, $f_2$, $f_3$, . . . ) and the reception frequency F of the radio receiver 5 is maintained to be higher than the threshold $f_{TH}$.

In addition, the control unit 4 includes the frequency changing unit 6 according to the first embodiment. The frequency changing unit 6 is comprised of, for example, an integrated circuit (IC). The ECU 10 (see FIG. 1) is configured to obtain the reception frequency F of the radio receiver 5, and transmit the reception frequency F of the radio receiver 5 to the frequency changing unit 6 by serial communication.

In particular, the frequency changing unit 6 of the first embodiment is configured to increase or decrease the driving frequency f by a predetermined frequency unit δf. The frequency unit δf can be set to 50 kHz, for example. If, for example, the driving frequency f is set to 400 kHz and the reception frequency F of the radio receiver 5 is set to 1242 kHz, the third harmonic of 400 kHz is 1200 kHz, and noise may be generated in the radio receiver 5.

In this case, the frequency changing unit 6 increases or decreases the driving frequency f by the frequency unit δf (=50 kHz). This causes the harmonic frequencies $f_n$ to shift from the reception frequency F, thereby suppressing noise radiated from the radio receiver 5.

Note that a feedback circuit 41a is provided in the power supply circuit 41 (see FIG. 2) according to the first embodiment. The feedback circuit 41a aims to maintain the boosted voltage $V_C$ applied to the drive circuit 40 constant even if the driving frequency f is changed. For example, the feedback circuit 41a is configured to adjust the duty factor of the power supply switch 42 in accordance with the boosted voltage $V_C$ fed back thereto, thus maintaining the boosted voltage $V_C$ constant. Note that the duty factor represents a controllable ratio, i.e. percentage, of the on-duration of the power supply switch 42 to a switching cycle of the power supply switch 42.

Figure 5:
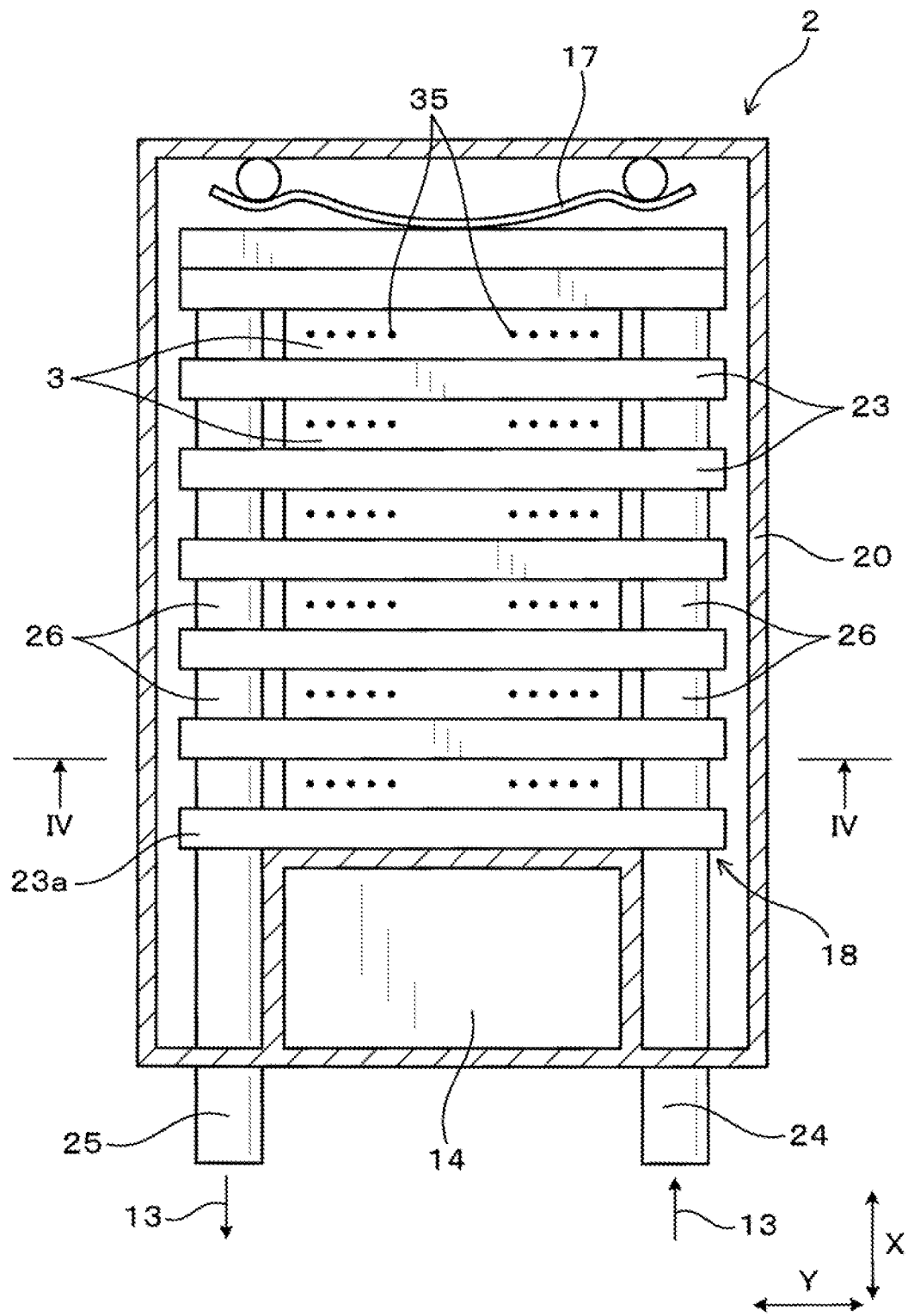
FIG. 5 is a cross-sectional view taken along V-V in FIG. 4.
Figure 6:
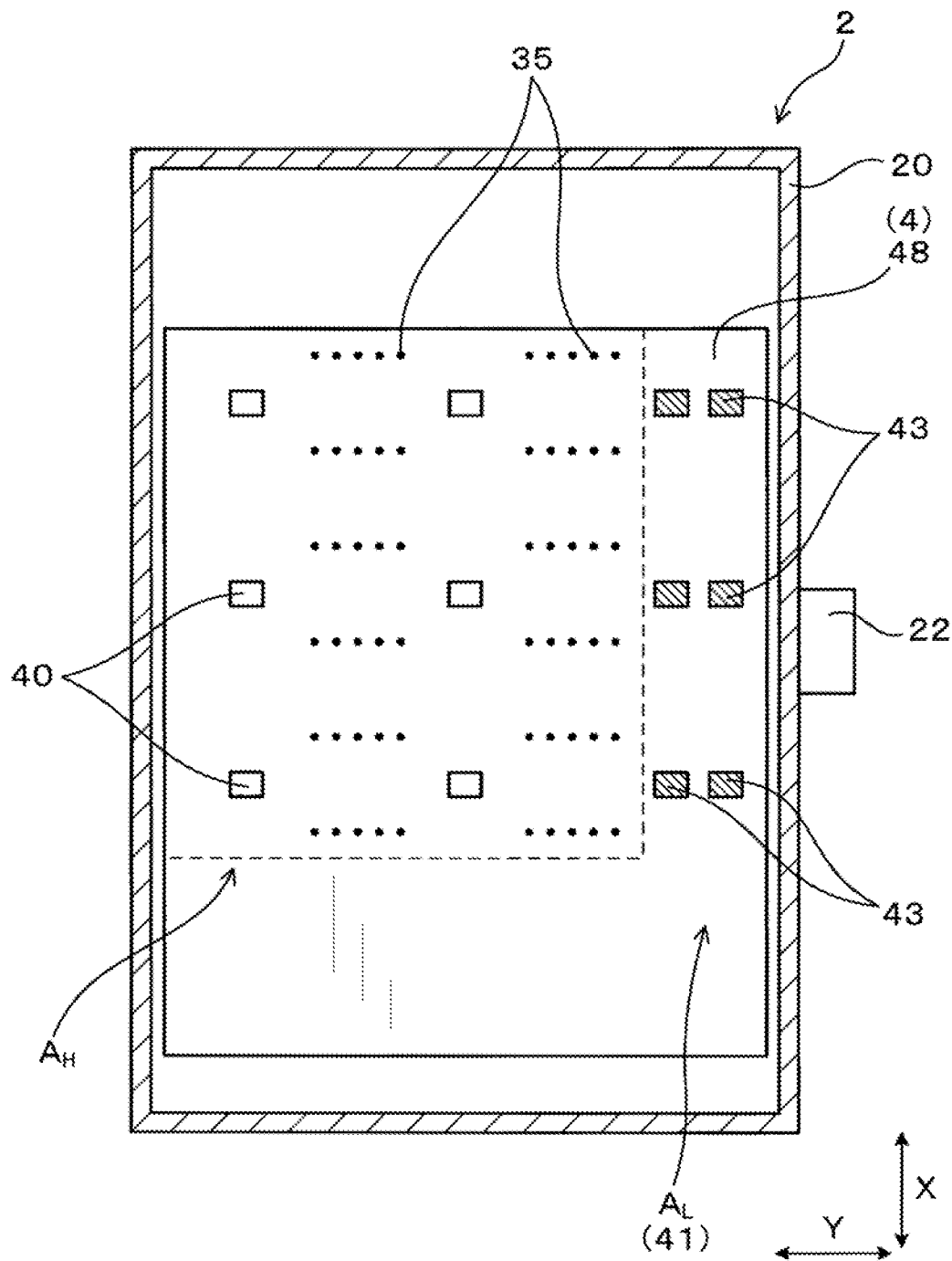
FIG. 6 is a cross-sectional view taken along VI-VI in FIG. 4.

Next, the following describes an example of the structure of the inverter 2 with reference to FIGS. 4 to 6.

As illustrated in FIGS. 4 and 5, the semiconductor modules 3 and cooling pipes 23 for cooling the semiconductor modules 3 are alternately staked to constitute a stack body 18 according to the first embodiment. Each of the semiconductor modules 3 includes, for example, a rectangular parallelepiped main body 33 in which the inverter switches 32 are incorporated. Each of the semiconductor modules 3 also includes power terminals 34 and control terminals 35. The power terminals 34 protrude from one of opposing first and second sides of the main body 33, and the control terminals 35 protrude from the other of the opposing first and second sides. The power terminals 34 include DC terminals $34_P$ and $34_N$ to be electrically connected to the DC power supply 8 (see FIG. 2), and include an AC terminal $34_A$ for outputting AC power.

The stack body 18 and the control unit 4 are accommodated in a housing 20 made of, for example, metal. The housing 20 is equipped with a connector 22 for external connection of the control unit 4. That is, the connector 22 mounted to the housing 20 enables the control unit 4 to be connected to the ECU 10 (see FIG. 1). The control unit 4 is comprised of a drive control board 48 and a signal control board 49.

To the drive control board 48, the drive circuit 40 and the power supply circuit 41 (see FIG. 2) are mounted. The signal control board 49 is connected to the connector 22. In addition, the signal control board 49 is connected to the drive control board 48 via unillustrated wires and/or connectors.

As illustrated in FIGS. 4 and 6, the drive control board 48 is connected to the control terminals 35 of the semiconductor modules 3. As illustrated in FIG. 6, the drive control board 48 includes a high-voltage region $A_H$ and a low-voltage region $A_L$. The high-voltage region $A_H$ is connected to the control terminals 35. The drive circuit 40 is mounted on the high-voltage region $A_H$, whereas the power supply circuit 41 is mounted on the low-voltage region $A_L$.

As illustrated in FIG. 4, the drive control board 48 and the signal control board 49 are arranged to be adjacent to each other with a predetermined gap therebetween in the thickness direction (Z direction) of the drive control board 48 and the signal control board 49. In addition, a shielding plate 21 made of metal is arranged in the gap between the drive control board 48 and the signal control board 49. The shielding plate 21 shields electromagnetic noise radiated from the transformer 43 of the power supply circuit 41. This suppresses leakage of a large amount of electromagnetic noise radiated from the transformer 43 to the outside through a gap between the connector 22 and the housing 20.

As illustrated in FIG. 5, each two of the cooling pipes 23 that are adjacent in the stack direction (X direction) of the stack body 18 are joined to each other via joining pipes 26. One of the joining pipes 26 is arranged to penetrate through one end of each of the cooling pipes 23 in its longitudinal direction, i.e. Y direction, to communicate with the cooling pipes 23. The other of the joining pipes 26 is arranged to penetrate through the other end of each of the cooling pipes 23 in its longitudinal direction (Y direction) to communicate with the cooling pipes 23.

The housing 20 has a substantially rectangular parallelepiped shape, and also has opposing first and second sidewalls in the X direction. Among the cooling pipes 23, a first end cooling pipe $23_a$ located at a first end of the stack body 18, which is closer to the first sidewall in the X direction, is jointed at its first edge in the Y direction to an inlet pipe 24 for introducing a refrigerant 13 into the cooling pipe $23_a$. That is, one end of the inlet pipe 24 is penetrated through a corresponding end of the first sidewall to be exposed from the housing 20.

The first end cooling pipe $23_a$ is joined at its opposing second edge in the Y direction to an outlet pipe 25 for discharging the refrigerant 13 that has been circulated through the cooking pipes 23. That is, the other end of the inlet pipe 24 is penetrated through a corresponding end of the first sidewall to be exposed from the housing 20.

The refrigerant 13 is introduced through the inlet pipe 24 and flows in all of the cooling pipes 23 through the joining pipes 26 to be discharged from the outlet pipe 25. Thus, each of the semiconductor modules 3 is cooled.

In addition, a pressing member 17, such as a plate spring, is arranged to the inner surface of the second sidewall of the housing 20 to apply pressure to the stack body 18 in the X direction toward the first sidewall of the housing 20. This ensures sufficient contact pressure between the cooling pipes 23 and the semiconductor modules 3 while fastening the stack body 18 to the housing 20.

Figure 7:
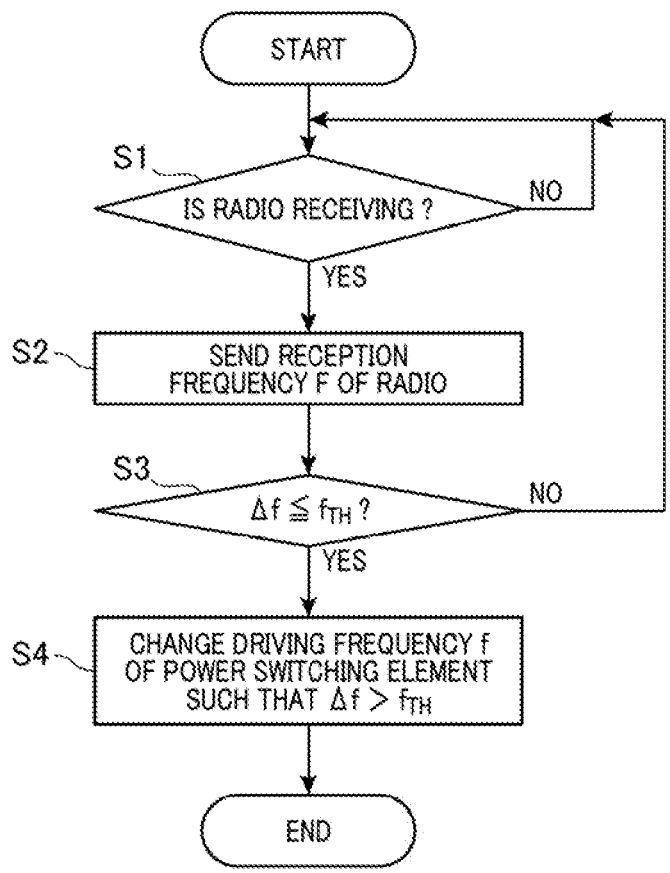
FIG. 7 is a flowchart schematically illustrating a drive frequency control routine carried out by the power converter system according to the first embodiment.

Next, the following describes a drive frequency control routine carried out by the power converter system 1 with reference to the flowchart of FIG. 7. As illustrated in FIG. 7, the ECU 10 of the power converter system 1 determines whether the radio receiver 5 is receiving a selected channel, i.e. frequency, of radio in step S1.

When it is determined that the radio receiver 5 is not receiving the selected channel of radio (NO in step S1), the ECU 10 repeatedly performs the operation in step S1.

Otherwise, when it is determined that the radio receiver 5 is receiving the selected channel of radio (YES in step S1), the ECU 10 obtains the reception frequency F of the tuned channel of the radio from the radio receiver 5, and sends the reception frequency F to the frequency changing unit 6 in step S2.

Subsequently, the frequency changing unit 6 receives the reception frequency F, and calculates the harmonic frequencies $f_n$, that are harmonic frequencies of the driving frequency f of the power supply switch 42 in step S3. Thereafter, the frequency changing unit 6 calculates the absolute value of each of the frequency differences $\Delta f$ between any of the harmonic frequencies $f_n$ ($=f_1$, $f_2$, $f_3$, . . . ) and the reception frequency F, which can be expressed by the following equation $\Delta f=|f_n-F|$ in step S3. Then, the frequency changing unit 6 determines whether the absolute value of each of the frequency differences $\Delta f$ is equal to or smaller than the predetermined threshold $f_{TH}$ in step S3.

When it is determined that the absolute value of at least one of the frequency differences $\Delta f$ is larger than the predetermined threshold $f_{TH}$ (NO in step S3), the drive frequency control routine returns to step S1, and the operation in step S1 is repeatedly carried out.

Otherwise, when it is determined that the absolute value of at least one of the frequency differences $\Delta f$ is equal to or smaller than the predetermined threshold $f_{TH}$ (YES in step S3), the frequency changing unit 6 changes the driving frequency f of the power supply switch 42 such that the absolute value of at least one of the frequency differences $\Delta f$ becomes greater than the threshold $f_{TH}$ in step S4. Thereafter, the frequency changing unit 6 terminates the drive frequency control routine.

Next, the following describes how the power converter system 1 works, and also describes technical benefits obtained by the power converter system 1.

As illustrated in FIG. 2, the power converter system 1 according to the first embodiment includes the frequency changing unit 6. The frequency changing unit 6 calculates the harmonic frequencies $f_n$ that are harmonic frequencies of the driving frequency f of the power supply switch 42.

Then, when it is determined that the absolute value of at least one of the frequency differences Δf between at least one of the harmonic frequencies $f_n$ and the reception frequency F of the radio receiver 5 is equal to or smaller than the threshold $f_{TH}$, the frequency changing unit 6 changes the driving frequency f of the power supply switch 42 such that the absolute value of at least one of the frequency differences Δf becomes greater than the threshold $f_{TH}$.

This makes it possible to separate the harmonic frequencies $f_n$ that are frequencies of harmonics (i.e., electromagnetic noise) from the reception frequency F at least by the threshold $f_{TH}$, thereby efficiently restraining noise from being generated from the radio receiver 5.

In addition, as illustrated in FIG. 4, the inverter 2 according to the first embodiment includes the housing 20 that is made of metal and that accommodates the semiconductor modules 3 and the control unit 4. The housing 20 is equipped with the connector 22 for external connection of the control unit 4. In addition, the control unit 4 includes the drive control board 48 and the signal control board 49, between which the shielding plate 21 that shields electromagnetic noise radiated from the transformer 43 is arranged.

This prevents leakage of a large amount of electromagnetic noise from the connector 22 to the outside, thereby more efficiently restraining noise from being generated in the radio receiver 5. The connector 22 is commonly made of a material through which electromagnetic noise can easily pass, such as a synthetic resin. Thus, arranging the shield plate 21 between the drive control board 48 and the signal control board 49 is highly effective in shielding the electromagnetic noise from the transformer 43 and in suppressing the leakage of a large amount of electromagnetic noise from the connector 22.

As described above, the power converter system of the first embodiment makes it possible to restrain a large amount of noise from being generated in the radio receiver 5 due to electromagnetic noise radiated from the power supply circuit 41 for the inverter 2.

Second Embodiment

The following describes a power converter system 1A according to the second embodiment of the present disclosure in which the structure of a control unit 4A is different from the structure of the control unit 4 of the first embodiment.

Figure 8:
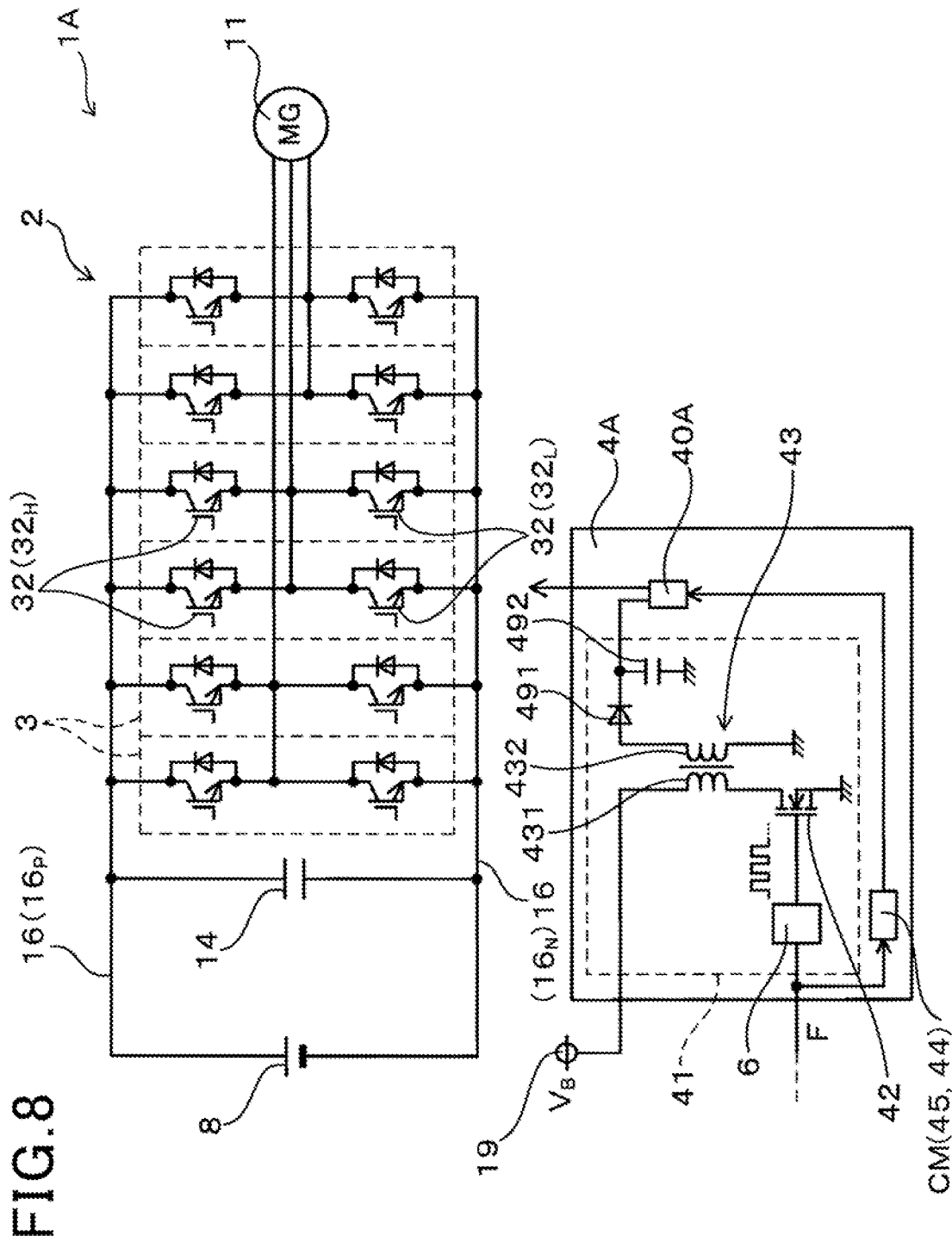
FIG. 8 is a circuit diagram schematically illustrating an example of the structure of each of an inverter and a control unit according to the second embodiment of the present disclosure.

As illustrated in FIG. 8, the control unit 4A according to the second embodiment includes a switching control module CM comprised of a determination unit 44 and a speed changing section 45. In FIG. 8, illustration of the feedback circuit 41a is omitted.

The determination unit 44 determines whether electromagnetic noise radiated due to on-off switching operations of the inverter switches 32 affects the radio receiver 5. If the determination unit 44 determines that electromagnetic noise affects the radio receiver 5, the speed changing unit 45 decreases the switching speed of each inverter switch 32. This restrains noise from being generated in the radio receiver 5.

Figure 9:
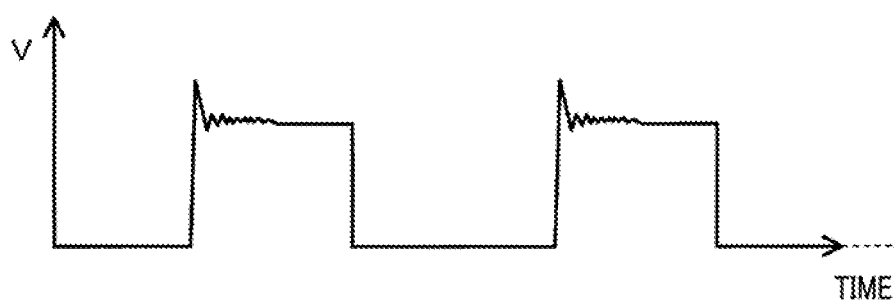
FIG. 9 is a graph schematically illustrating an example of the waveform of an on pulse for driving each inverter switch at high rising and falling speeds according to the second embodiment.
Figure 10:
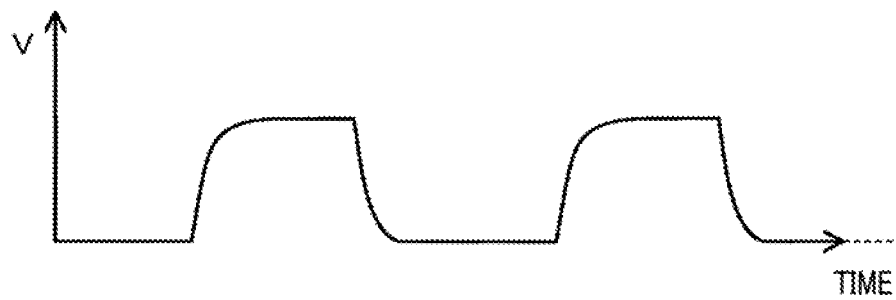
FIG. 10 is a graph schematically illustrating an example of the waveform of the on pulse for driving each inverter switch at low rising and falling speeds according to the second embodiment.

As illustrated in FIG. 9, when the drive circuit 40 sets the rising and falling speed of the on pulse V for each of the inverter switches 32 to be high, this high-speed rising and falling of each on pulse V may cause ringing to be generated in the corresponding on pulse V due to, for example, parasitic inductance of the busbars 16 ($16_H$, $16_N$) (see FIG. 8). Since the frequency of ringing is several MHz, noise may be generated in FM broadcasting. In this case, as illustrated in FIG. 10, the speed changing unit 45 is configured to cause the drive circuit 40 to set the switching speed, i.e. the rising and falling speed of the on pulse V, for each of the inverter switches 32 to a lower value. Although the switching loss of the inverter switches 32 is high, this configuration suppresses the ringing on each on pulse V, resulting in electromagnetic noise being unlikely to be generated, thereby preventing generation of noise in the radio receiver 5.

Figure 11:
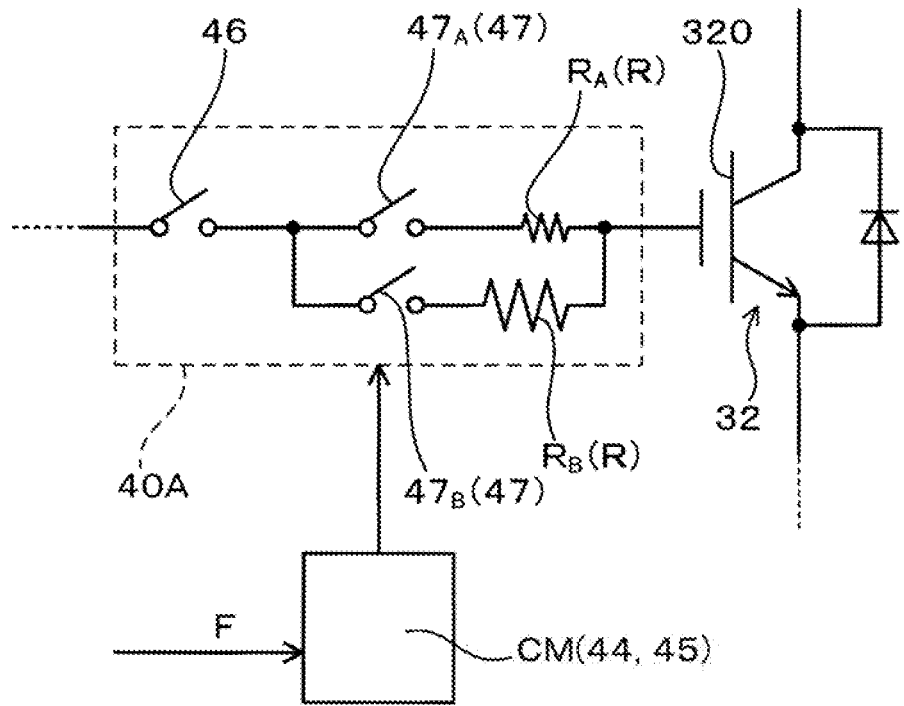
FIG. 11 is a circuit diagram of a part of a control unit according to the second embodiment.

As illustrated in FIG. 11, the drive circuit 40A according to the second embodiment includes a first speed limit resistor $R_A$ and a second speed limit resistor $R_B$.

The first speed limit resistor $R_A$ has a relatively low resistance, and the second speed limit resistor $R_B$ has a higher resistance than the first speed limit resistor $R_A$. These two speed limit resistors $R_A$ and $R_B$ are connected in parallel with each other. Each of the speed limit resistors $R_A$ and $R_B$ is connected to the control terminal 320 of each inverter switch 32. In addition, selection switches 47 ($47_A$ and $47_B$) for selecting either one of the speed limit resistors $R_A$ and $R_B$ are provided in series with the speed limit resistors $R_A$ and $R_B$. Furthermore, the drive circuit 40 includes a driving switch 46 for driving each of the inverter switches 32.

When the determination unit 44 determines that the radio receiver 5 is not receiving FM broadcasting, so that no noise is generated in the radio receiver 5 even if ringing is generated in the on pulse V for each inverter switch 32, the speed changing unit 45 selects the first speed limit resistor $R_A$ having a low resistance. That is, the speed changing unit 45 selectively turns on the first selection switch $47_A$ while keeping off the second selection switch $47_B$, thus applying the on pulse V to the control terminal 320 of each inverter switch 32 through the first speed limit resistor $R_A$ for turning on the corresponding inverter switch 32. This causes the inverter switches 32 to turn on or off at higher rising and falling speeds (see FIG. 9), thereby reducing the switching loss.

In contrast, when the determination unit 44 determines that the radio receiver 5 is receiving FM broadcasting, so that noise may be generated in the radio receiver 5 due to ringing in the on pulse V for each inverter switch 32, the speed changing unit 45 selects the second speed limit resistor $R_B$ having a high resistance. That is, the speed changing unit 45 selectively turns on the second selection switch $47_B$ while keeping off the first selection switch $47_A$, thus applying the on pulse V to the control terminal 320 of each inverter switch 32 through the second speed limit resistor $R_B$ for turning on the corresponding inverter switch 32. This causes the inverter switches 32 to turn on or off at lower rising and falling speeds (see FIG. 10), thereby preventing ringing from being generated on the on pulse V for each inverter switch 32. This restrains noise from being generated in the radio receiver 5.

Figure 12:
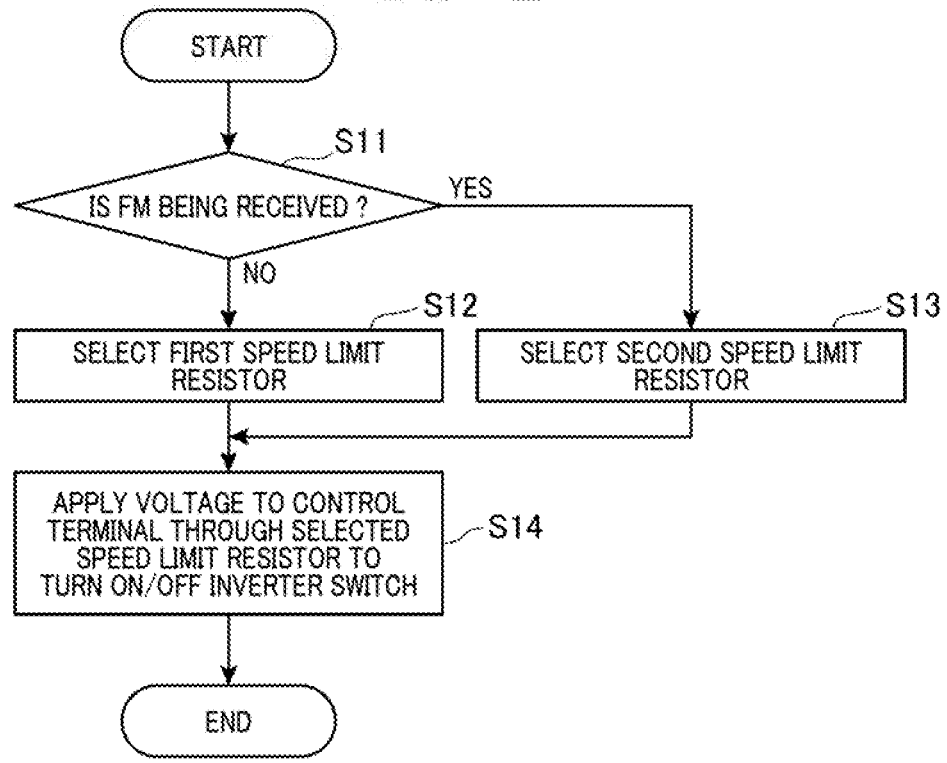
FIG. 12 is a flowchart schematically illustrating a switch control routine carried out by a control unit of the power converter system according to the second embodiment.

Next, the following describes a switch control routine carried out by the control unit 4A of the power converter system 1A with reference to the flowchart of FIG. 12.

As illustrated in FIG. 12, the control unit 4A determines whether the radio receiver 5 is receiving FM broadcasting, i.e. whether the radio receiver 5 is affected by electromagnetic noise radiated by ringing of the inverter switches 32 in step S11. When it is determined that the radio receiver 5 is not receiving FM broadcasting (NO in step S11), the switch control routine proceeds to step S12. In step S12, the control unit 4A turns on the first selection switch $47_A$ while keeping off the second selection switch $47_B$, thus selecting the first speed limit resistor $R_A$ in step S12.

Otherwise, when it is determined that the radio receiver 5 is receiving FM broadcasting (YES in step S11), the switch control routine proceeds to step S13. In step S13, the control unit 4A turns on the second selection switch $47_B$ while keeping off the first selection switch $47_A$, thus selecting the second speed limit resistor $R_B$ in step S13.

After the operation in step S13 or S14, the control unit 4A applies the on pulse V to the control terminal 320 of each inverter switch 32 through the selected one of the speed limit resistors $R_A$ and $R_B$, thus turning on the corresponding one of the inverter switches 32.

The following describes technical benefits obtained by the power converter system 1A according to the second embodiment The above configuration of the power converter system 1A restrains noise from being generated in the radio receiver 5 due to switching of each inverter switch 32 in addition to the technical benefits obtained by the power converter system 1 of the first embodiment.

Third Embodiment

The following describes a power converter system 1B according to the third embodiment of the present disclosure in which the structure of a control unit 4B is different from the structure of the control unit 4 of the first embodiment.

Figure 13:
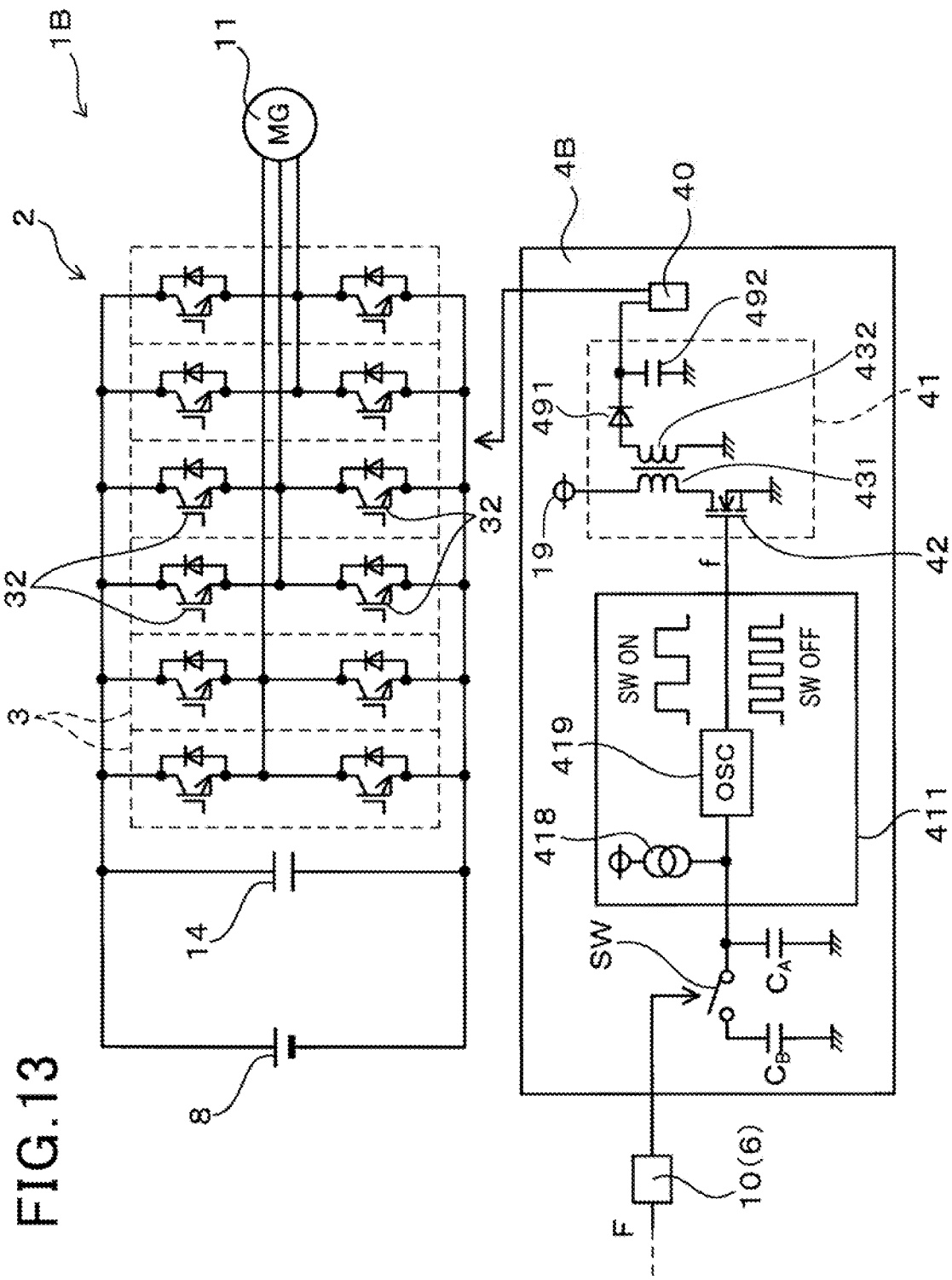
FIG. 13 is a circuit diagram schematically illustrating an example of the structure of each of an inverter and a control unit according to the third embodiment of the present disclosure.

As illustrated in FIG. 13, the control unit 4B according to the third embodiment includes a driving-signal generating circuit 411, a frequency change switch SW, and two capacitors $C_A$ and $C_B$. The two capacitors $C_A$ and $C_B$ are connected to the driving-signal generating circuit 411. The frequency change switch SW is provided between the two capacitors $C_A$ and $C_B$. In addition, the frequency changing unit 6 is not provided in the control unit 4B according to the third embodiment. In this embodiment, the ECU 10 also serves as the frequency changing unit 6. In FIG. 13, illustration of the feedback circuit 41a is omitted.

The driving-signal generating circuit 411 includes an oscillator 419 and a constant-current source 418. The switch SW has opposing first and second terminals and a control terminal. The oscillator 419 has an input terminal connected to the constant-current source 418 and to the input terminal of the frequency change switch SW, and also has an output terminal connected to the control terminal of the power supply switch 42.

Each of the capacitors $C_A$ and $C_B$ has opposing first and second electrodes facing each other. The first electrode of the capacitor $C_A$ is connected between the first terminal of the frequency change switch SW and the input terminal of the oscillator 419, and the second electrode of the capacitor $C_A$ is connected to a common signal ground. The first electrode of the capacitor $C_B$ is connected to the second terminal of the frequency change switch SW, and the second electrode of the capacitor $C_B$ is connected to the common signal ground. The ECU 10 is configured to control on-off switching operations of the frequency change switch SW.

The oscillator 419 deter mines the frequency of the driving signal supplied to the control terminal of the power supply switch 42, i.e. the driving frequency f of the power supply switch 42, based on time required for charging and discharging of the capacitors C ($C_A$ and $C_B$) based on a constant current output from the constant current source 418.

That is, charging and discharging time for the capacitors C ($C_A$ and $C_B$) based on the constant current output from the constant current source 418 while the frequency change switch SW is on defines an on duration of each pulse of the drive signal, and driving frequency f of the drive signal.

Specifically, when the frequency change switch SW is turned off, only the first capacitor $C_A$ out of the two capacitors $C_A$ and $C_B$ is connected to the driving-signal generating circuit 411. Thus, the first capacitor $C_A$ is charged and thereafter discharged in a short time, resulting in the frequency of the driving signal (i.e., the driving frequency f) output from the oscillator 419 to the power supply switch 42 becomes high. Otherwise, when the frequency change switch SW is turned on, both of the two capacitors $C_A$ and $C_B$ are connected to the driving-signal generating circuit 411. Thus, the capacitors $C_A$ and $C_B$ are charged and thereafter discharged in a longer time, resulting in the frequency of the driving signal (i.e., the driving frequency f) output from the oscillator 419 to the power supply switch 42 becomes low.

When it is determined that the absolute value of at least one of the frequency differences Δf between at least one harmonic frequency (i.e., at least one of the harmonic frequencies $f_n$) of the driving frequency f and the reception frequency F is equal to or smaller than the threshold $f_{TH}$, the frequency changing unit 6 switches the frequency change switch SW from an on state to an off state, or from the off state to the on state. This changes the driving frequency f such that the absolute value of at least one of the frequency differences Δf becomes greater than the threshold $f_{TH}$.

The above configuration of the power converter system 1B therefore restrains noise from being generated in the radio receiver 5 in addition to the technical benefits obtained by the power converter system 1 of the first embodiment.

Fourth Embodiment

The following describes a power converter system 1C according to the fourth embodiment of the present disclosure in which the arrangement of the transformer 43 is different from that according to the first embodiment.

As illustrated in FIG. 14, the transformer 43 according to the fourth embodiment is arranged at a position more distant from the connector 22 than a middle part M of the drive control board 48 is in the direction (Y direction) in which an external-device connector 220 that is to be connected to the connector 22 is inserted and detached.

This makes it possible to arrange the transformer 43 at a position distant from the connector 22. Thus, this configuration obtains a technical benefit that electromagnetic noise radiated from the transformer 43 is unlikely to leak to the outside from the connector 22, thereby more efficiently suppressing noise from being generated in the radio receiver 5 in addition to the technical benefits obtained by the power converter system 1 of the first embodiment.

The power converter system according to each embodiment is designed as an inverter system including the inverter 2, but can be designed as a voltage converter including a voltage converter in place of the inverter 2.

The control unit 4 can be separated from the inverter 2.

While illustrative embodiments of the present disclosure have been described herein, the present disclosure is not limited to the embodiments described herein, but includes any and all embodiments having modifications, omissions, combinations (e.g., of aspects across various embodiments), adaptations and/or alternations as would be appreciated by those in the art based on the present disclosure. The limitations in the claims are to be interpreted broadly based on the language employed in the claims and not limited to examples described in the present specification or during the prosecution of the application, which examples are to be construed as non-exclusive.

The invention claimed is:

1. A power converter system comprising:
a power converter including a semiconductor module, the semiconductor module including a converter switch;
a control unit for controlling operation of the converter switch to thereby cause the power converter to convert input power to output power; and
a radio receiver arranged to be close to the power converter,
the control unit including
a drive circuit configured to control on-off switching operations of the converter switch;
a power supply circuit that includes a power supply switch and a transformer connected to the power supply switch,
the power supply circuit being configured to cyclically turn on the power supply switch at a driving frequency to accordingly generate a power supply voltage for the drive circuit; and
a frequency changing unit configured to:
obtain a reception frequency of the radio receiver;
calculate harmonic frequencies of the driving frequency of the power supply switch;
determine whether an absolute value of each of frequency differences between any of the harmonic frequencies and the reception frequency is equal to or smaller than a predetermined threshold; and
change the driving frequency such that the absolute value of at least one of the frequency differences becomes greater than the predetermined threshold when determining that the absolute value of the at least one of the frequency differences is equal to or smaller than the predetermined threshold.

2. The power converter system according to claim 1, wherein:
the control unit further includes:
a determination unit configured to determine whether electromagnetic noise radiated due to the on-off switching operations of the converter switch affects the radio receiver; and
a speed changing unit configured to decrease a switching speed of the converter switch when it is determined that the electromagnetic noise affects the radio receiver.

3. The power converter system according to claim 2, wherein:
the converter switch has a control terminal;
the drive circuit includes:
a first speed limit resistor having a resistance;
a second speed limit resistor having a higher resistance than the resistance of the first speed limit resistor; and
a selection switch for selecting one of the first and second speed limit resistors,
each of the first and second speed limit resistors is connected in series to the control terminal of the converter switch,
the drive circuit being configured to apply a voltage to the control terminal of the converter switch to thereby turn on the converter switch; and
the speed changing unit is configured to select the second speed limit resistor, so that the voltage is applied to the control terminal through the second speed limit resistor, thus decreasing a switching speed of the control switch.

4. The power converter system according to claim 1, wherein:
the power converter includes the control unit, and further includes:
a housing that is made of metal and that accommodates the semiconductor module and the control unit; and
a connector mounted to the housing for external connection of the control unit;
the control unit includes:
a drive control board to which the drive circuit and the power supply circuit are mounted; and
a signal control board that is connected to the drive control board and the connector; and
the drive control board and the signal control board are arranged to be adjacent to each other with a predetermined gap therebetween in a thickness direction of the drive control board and the signal control board,
the power converter system further comprising:
a shielding plate arranged in the gap between the drive control board and the signal control board for shielding electromagnetic noise radiated from the transformer mounted to the drive control board.

5. The power converter system according to claim 2, wherein:
the power converter includes the control unit, and further includes:
a housing that is made of metal and that accommodates the semiconductor module and the control unit; and
a connector mounted to the housing for external connection of the control unit;
the control unit includes:
a drive control board to which the drive circuit and the power supply circuit are mounted; and
a signal control board that is connected to the drive control board and the connector; and
the drive control board and the signal control board are arranged to be adjacent to each other with a predetermined gap therebetween in a thickness direction of the drive control board and the signal control board,
the power converter system further comprising:
a shielding plate arranged in the gap between the drive control board and the signal control board for shielding electromagnetic noise radiated from the transformer mounted to the drive control board.

6. The power converter system according to claim 3, wherein:
the power converter includes the control unit, and further includes:
a housing that is made of metal and that accommodates the semiconductor module and the control unit; and
a connector mounted to the housing for external connection of the control unit;
the control unit includes:
a drive control board to which the drive circuit and the power supply circuit are mounted; and
a signal control board that is connected to the drive control board and the connector; and
the drive control board and the signal control board are arranged to be adjacent to each other with a predetermined gap therebetween in a thickness direction of the drive control board and the signal control board, the power converter system further comprising:

a shielding plate arranged in the gap between the drive control board and the signal control board for shielding electromagnetic noise radiated from the transformer mounted to the drive control board.

7. The power converter system according to claim 4, wherein:

the transformer is arranged at a position more distant from the connector than a middle part of the drive control board is in a direction in which an external-device connector that is to be connected to the connector is inserted and detached.

8. The power converter system according to claim 5, wherein:

the transformer is arranged at a position more distant from the connector than a middle part of the drive control board is in a direction in which an external-device connector that is to be connected to the connector is inserted and detached.

9. The power converter system according to claim 6, wherein:

the transformer is arranged at a position more distant from the connector than a middle part of the drive control board is in a direction in which an external-device connector that is to be connected to the connector is inserted and detached.

* * * * *